(12) United States Patent
Goldfinch et al.

(10) Patent No.: US 8,529,720 B2
(45) Date of Patent: Sep. 10, 2013

(54) AEROFOIL SUB-ASSEMBLY, AN AEROFOIL AND A METHOD OF MAKING AN AEROFOIL

(75) Inventors: Keith C. Goldfinch, Bristol (GB); Oliver M. Strother, Nottingham (GB)

(73) Assignee: Rolls-Royce, PLC, London (GB)

( * ) Notice: Subject to any disclaimer, the term of this patent is extended or adjusted under 35 U.S.C. 154(b) by 745 days.

(21) Appl. No.: 12/453,762

(22) Filed: May 21, 2009

(65) Prior Publication Data

US 2010/0021693 A1      Jan. 28, 2010

(30) Foreign Application Priority Data

Jul. 24, 2008   (GB) .................... 0813539.4

(51) Int. Cl.
*B32B 3/00*      (2006.01)
*B32B 37/00*   (2006.01)

(52) U.S. Cl.
USPC .......... 156/182; 29/421.1; 29/889.71; 156/60

(58) Field of Classification Search
USPC ...................... 156/182, 60; 29/421.1, 889.72
See application file for complete search history.

(56) References Cited

U.S. PATENT DOCUMENTS

| | | | |
|---|---|---|---|
| 2,202,014 A | 5/1940 | Lougheed | |
| 3,111,747 A | 11/1963 | Johnson | |
| 3,736,638 A | 6/1973 | Stone, Jr. | |
| 3,927,817 A | 12/1975 | Hamilton et al. | |
| 4,217,397 A | 8/1980 | Hayase et al. | |
| 4,292,375 A | 9/1981 | Ko | |
| 4,304,821 A | 12/1981 | Hayase et al. | |
| 4,331,284 A | 5/1982 | Schulz et al. | |
| 4,522,860 A | 6/1985 | Scott et al. | |
| 4,530,197 A | 7/1985 | Rainville | |
| 4,583,914 A | 4/1986 | Craig et al. | |
| 4,642,863 A | 2/1987 | Schulz | |

(Continued)

FOREIGN PATENT DOCUMENTS

| EP | 0 130 583 A2 | 1/1985 |
|---|---|---|
| EP | 0 181 203 A2 | 5/1986 |

(Continued)

OTHER PUBLICATIONS

Sep. 2, 2009 European Search Report in European Application No. 09 25 1341.

(Continued)

*Primary Examiner* — Brent Ohern
(74) *Attorney, Agent, or Firm* — Oliff & Berridge, PLC (57) ABSTRACT

A method of making an aerofoil comprises the steps of providing first and second skin panels and first and second web-forming membranes. The web-forming membranes each have a series of elongate slots formed longitudinally therein so as to define a series of alternating wide and narrow strips. The wide strips of one membrane are arranged against the narrow strips of the other membrane and the skin panels are arranged either side of the two web-forming membranes. Parts of the web-forming membranes and parts of the skin panels are treated with a release layer and the sub-assembly is compressed and heated so as to effect diffusion bonding between those parts of the membranes and skin panels which are not treated with the release layer. The sub-assembly is then heated and inflated so as to draw the first and second skin panels apart and that, in turn, causes the web-forming membranes to form webs internally.

8 Claims, 9 Drawing Sheets

(56) References Cited

U.S. PATENT DOCUMENTS

| | | |
|---|---|---|
| 4,655,014 A | 4/1987 | Krecke |
| 4,811,890 A | 3/1989 | Dowling et al. |
| 4,882,823 A | 11/1989 | Weisert et al. |
| 5,007,225 A | 4/1991 | Teasdale |
| 5,119,531 A | 6/1992 | Berger et al. |
| 5,143,276 A | 9/1992 | Mansbridge et al. |
| 5,240,376 A | 8/1993 | Velicki |
| 5,243,758 A | 9/1993 | LeMonds et al. |
| 5,253,419 A | 10/1993 | Collot et al. |
| 5,323,953 A | 6/1994 | Adderley et al. |
| 5,330,092 A | 7/1994 | Gregg et al. |
| 5,384,959 A | 1/1995 | Velicki |
| 5,419,039 A | 5/1995 | Auxier et al. |
| 5,469,618 A | 11/1995 | LeMonds et al. |
| 5,534,354 A | 7/1996 | Gregg et al. |
| 5,544,805 A | 8/1996 | Alassoeur et al. |
| 5,570,552 A | 11/1996 | Nehring |
| 5,692,881 A * | 12/1997 | Leibfried ............ 416/233 |
| 5,723,225 A | 3/1998 | Yasui et al. |
| 5,821,506 A | 10/1998 | Matsen |
| 5,826,332 A | 10/1998 | Bichon et al. |
| 5,881,459 A | 3/1999 | Yasui |
| 5,941,446 A | 8/1999 | Yasui |
| 6,039,542 A | 3/2000 | Schilling et al. |
| 6,139,278 A | 10/2000 | Mowbray et al. |
| 6,224,341 B1 | 5/2001 | Fricke |
| 6,287,080 B1 | 9/2001 | Evans et al. |
| 6,331,217 B1 | 12/2001 | Burke et al. |
| 6,419,146 B1 | 7/2002 | Buldhaupt et al. |
| 6,467,168 B2 | 10/2002 | Wallis |
| 6,669,447 B2 | 12/2003 | Norris et al. |
| 6,720,087 B2 | 4/2004 | Fried et al. |
| 6,893,211 B1 | 5/2005 | Eibl et al. |
| 6,979,180 B2 | 12/2005 | Motherwell |
| 7,025,568 B2 | 4/2006 | Jones |
| 7,070,390 B2 | 7/2006 | Powell |
| 7,144,222 B2 | 12/2006 | Lanni et al. |
| 7,247,003 B2 | 7/2007 | Burke et al. |
| 7,311,500 B2 | 12/2007 | Rongong et al. |
| 7,431,197 B2 | 10/2008 | Franchet et al. |
| 7,470,114 B2 | 12/2008 | Bonnet |
| 7,753,654 B2 | 7/2010 | Read et al. |
| 2002/0014101 A1 | 2/2002 | Yajima |
| 2003/0136815 A1 | 7/2003 | Debaisieux et al. |
| 2003/0156942 A1 | 8/2003 | Villhard |
| 2003/0164255 A1 | 9/2003 | Borroni-Bird et al. |
| 2004/0018091 A1 | 1/2004 | Rongong et al. |
| 2004/0191069 A1 | 9/2004 | Motherwell |
| 2006/0066133 A1 | 3/2006 | Ueno et al. |
| 2006/0255098 A1 | 11/2006 | Runyan |
| 2007/0065291 A1 | 3/2007 | Karafillis |
| 2007/0243070 A1 | 10/2007 | Matheny |
| 2007/0243408 A1 | 10/2007 | Straza |
| 2008/0025846 A1 | 1/2008 | Vance et al. |
| 2009/0057488 A1 | 3/2009 | Goldfinch et al. |
| 2009/0057489 A1 | 3/2009 | Goldfinch et al. |
| 2009/0057718 A1 | 3/2009 | Suvorov et al. |
| 2009/0060718 A1 | 3/2009 | Goldfinch et al. |
| 2009/0304517 A1 | 12/2009 | Strother |
| 2010/0021693 A1 | 1/2010 | Goldfinch et al. |
| 2010/0186215 A1 | 7/2010 | Jones et al. |

FOREIGN PATENT DOCUMENTS

| | | |
|---|---|---|
| EP | 0 209 867 A2 | 1/1987 |
| EP | 0 358 523 A1 | 3/1990 |
| EP | 0 418 179 A1 | 3/1991 |
| EP | 0 469 221 A1 | 2/1992 |
| EP | 0 354 631 B1 | 6/1992 |
| EP | 0 500 458 A1 | 8/1992 |
| EP | 0 520 827 A2 | 12/1992 |
| EP | 0 527 564 A1 | 2/1993 |
| EP | 0 549 172 A1 | 6/1993 |
| EP | 0 555 534 A2 | 8/1993 |
| EP | 0 582 795 A1 | 2/1994 |
| EP | 0 594 885 A1 | 5/1994 |
| EP | 0 765 711 A1 | 4/1997 |
| EP | 0 716 273 B1 | 3/1998 |
| EP | 0 926 312 A2 | 6/1999 |
| EP | 1 013 355 A2 | 6/2000 |
| EP | 1 085 288 A1 | 3/2001 |
| EP | 0 594 886 B1 | 7/2001 |
| EP | 1 160 752 A1 | 12/2001 |
| EP | 1 184 768 A2 | 3/2002 |
| EP | 1 024 330 B1 | 11/2002 |
| EP | 0 886 813 B1 | 1/2003 |
| EP | 1 327 489 A1 | 7/2003 |
| EP | 1 355 212 A1 | 10/2003 |
| EP | 1 433 993 A1 | 6/2004 |
| EP | 1 460 347 A1 | 9/2004 |
| EP | 1 460 507 A2 | 9/2004 |
| EP | 1 466 692 A1 | 10/2004 |
| EP | 1 491 980 A2 | 12/2004 |
| EP | 1 541 953 A1 | 6/2005 |
| EP | 1 561 901 A2 | 8/2005 |
| EP | 1 160 640 B1 | 2/2006 |
| EP | 1 653 165 A1 | 5/2006 |
| EP | 1 811 129 A2 | 7/2007 |
| EP | 2 014 384 A1 | 1/2009 |
| EP | 2 014 386 A1 | 1/2009 |
| EP | 2 014 387 A1 | 1/2009 |
| EP | 2 014 388 A1 | 1/2009 |
| EP | 2 014 869 A1 | 1/2009 |
| EP | 2 223 766 A1 | 9/2010 |
| GB | 842937 A | 7/1960 |
| GB | 1 367 958 A | 9/1974 |
| GB | 1 437 510 A | 5/1976 |
| GB | 2 124 520 A | 2/1984 |
| GB | 2 154 287 A | 9/1985 |
| GB | 1 284 867 A | 7/1987 |
| GB | 2 193 306 A | 2/1988 |
| GB | 2 198 264 A | 6/1988 |
| GB | 2 202 619 A | 9/1988 |
| GB | 2 206 685 A | 1/1989 |
| GB | 2 211 593 A | 7/1989 |
| GB | 2 228 069 A | 8/1990 |
| GB | 2 249 615 A | 5/1992 |
| GB | 2 251 063 A | 6/1992 |
| GB | 2 261 032 A | 5/1993 |
| GB | 2 298 265 A | 8/1996 |
| GB | 2 305 720 A | 4/1997 |
| GB | 2 360 070 A | 9/2001 |
| GB | 2 371 095 | 7/2002 |
| GB | 2 387 669 A | 10/2003 |
| GB | 2 391 270 A | 2/2004 |
| GB | 2 393 498 A | 3/2004 |
| GB | 2 397 855 A | 8/2004 |
| GB | 2 401 407 A | 11/2004 |
| GB | 2 402 716 A | 12/2004 |
| GB | 2 408 295 A | 5/2005 |
| GB | 2 411 462 A | 8/2005 |
| GB | 2 416 228 A | 1/2006 |
| GB | 2 450 934 A | 1/2009 |
| GB | 2 450 935 A | 1/2009 |
| JP | A-2008-133825 | 6/2008 |
| WO | WO 97/27045 A2 | 7/1997 |
| WO | WO 00/70271 A1 | 11/2000 |
| WO | WO 01/56332 A1 | 8/2001 |
| WO | WO 01/82018 A2 | 11/2001 |
| WO | WO 02/48615 A2 | 6/2002 |
| WO | WO 03/025469 A1 | 3/2003 |
| WO | WO 03/042607 A1 | 5/2003 |
| WO | WO 03/093916 A2 | 11/2003 |
| WO | WO 2004/102077 A1 | 11/2004 |
| WO | WO 2005/022953 A1 | 3/2005 |
| WO | WO 2005/045326 A1 | 5/2005 |
| WO | WO 2005/067619 A2 | 7/2005 |
| WO | WO 2005/069820 A2 | 8/2005 |
| WO | WO 2005/071510 A1 | 8/2005 |

OTHER PUBLICATIONS

Jan. 17, 2013 Office Action issued in U.S. Appl. No. 12/654,211.
Dec. 14, 2010 Search Report issued in British Application No. GB1020063.2.

Jul. 28, 2009 Search Report issued in British Patent Application No. 0907004.6.
Jul. 27, 2010 Search Report issued in European Patent Application No. EP 10 15 7495.2.
Jan. 19, 2010 Search Report issued in British Patent Application No. 0916687.7.
May 19, 2010 European Search Report issued in related European Patent Application No. 09252779.5 (with Abstract).
May 5, 2009 British Search Report issued in related British Patent Application No. GB0901235.2.
Mar. 18, 2009 British Search Report issued in British Patent Application No. GB0901318.6.
Oct. 7, 2008 European Search Report issued in European Patent Application No. 08 01 1077.
Oct. 20, 2008 European Search Report issued in European Patent Application No. 08 01 1078.
Oct. 21, 2008 European Search Report issued in European Patent Application No. 08 01 1079.
Dec. 7, 2010 Search Report issued in British Application No. GB1013305.6.
Sep. 2, 2010 Search Report issued in British Application No. GB1009216.1.
Sep. 15, 2009 Search Report issued in British Application No. GB0911416.6.
May 11, 2011 Partial European Search Report issued in European Application No. 10 16 5255.
Sep. 22, 2008 Search Report issued in British Application No. GB0808840.3.
Aug. 28, 2007 Search Report issued in British Application No. GB0713700.3.
Sep. 16, 2008 Search Report issued in British Application No. GB0813539.4.
Mar. 7, 2008 Search Report issued in British Application No. GB0713699.7.
Oct. 12, 2007 Search Report issued in British Application No. GB0713699.7.
Jul. 1, 2011 Office Action issued in U.S. Appl. No. 12/216,503.
Dec. 27, 2011 Notice of Allowance issued in U.S. Appl. No. 12/216,503.
Sep. 26, 2011 Office Action issued in U.S. Appl. No. 12/453,435.
Feb. 25, 2011 Office Action issued in U.S. Appl. No. 12/216,505.
Jun. 2, 2011 Office Action issued in U.S. Appl. No. 12/216,505.
Nov. 23, 2011 Office Action issued in U.S. Appl. No. 12/216,505.
Feb. 3, 2011 Office Action issued in U.S. Appl. No. 12/216,497.
Jul. 20, 2011 Office Action issued in U.S. Appl. No. 12/216,497.
Mar. 9, 2011 Notice of Allowance issued in U.S. Appl. No. 12/216,502.
Dec. 6, 2010 Office Action issued in U.S. Appl. No. 12/216,502.
U.S. Appl. No. 13/299,671 in the name of Strother, filed Nov. 18, 2011.
U.S. Appl. No. 12/654,504 in the name of Jones et al., filed Dec. 22, 2009.
U.S. Appl. No. 12/645,211 in the name of Strother, filed Dec. 14, 2009.
U.S. Appl. No. 12/844,215 in the name of Harron, filed Jul. 27, 2010.
U.S. Appl. No. 12/730,641 in the name of Strother, filed Mar. 24, 2010.
U.S. Appl. No. 12/216,503 in the name of Goldfinch et al, filed Jul. 7, 2008.
U.S. Appl. No. 13/186,850 in the name of Goldfinch et al, filed Jul. 20, 2011.
U.S. Appl. No. 13/114,382 in the name of Strother, filed May 24, 2010.
U.S. Appl. No. 12/216,505 in the name of Strother, filed Jul. 7, 2008.
U.S. Appl. No. 12/453,435 in the name of Strother, filed May 11, 2009.
U.S. Appl. No. 12/796,231 in the name of Mason, filed Jun. 8, 2010.
U.S. Appl. No. 13/008,323 in the name of Strother, filed Jan. 18, 2011.
U.S. Appl. No. 12/720,253 in the name of Strother, filed Mar. 9, 2010.
U.S. Appl. No. 12/720,351 in the name of Strother, filed Mar. 9, 2010.
U.S. Appl. No. 12/216,502 in the name of Goldfinch et al., filed Jul. 7, 2008.
U.S. Appl. No. 12/216,497 in the name of Goldfinch et al., filed Jul. 7, 2008.
Feb. 21, 2013 Office Action issued in U.S. Appl. No. 12/216,505.
Mar. 7, 2012 Office Action issued in U.S. Appl. No. 12/453,435.
Mar. 12, 2012 Notice of Allowance issued in U.S. Appl. No. 12/216,503.
Mar. 20, 2012 Office Action issued in U.S. Appl. No. 12/216,505.
Apr. 16, 2012 Office Action issued in U.S. Appl. No. 12/216,502.
Jun. 29, 2012 Office Action isued in U.S. Appl. No. 12/654,504.
Sep. 6, 2012 Office Action issued in U.S. Appl. No. 12/216,505.
Jun. 20, 2013 Office Action Issued in U.S. Appl. No. 12/730,641.

* cited by examiner

AEROFOIL SUB-ASSEMBLY, AN AEROFOIL AND A METHOD OF MAKING AN AEROFOIL

BACKGROUND OF THE INVENTION

The invention relates to an aerofoil sub-assembly for use in the formation of a hollow aerofoil, particularly an aerofoil for use as a fan blades in a jet engine. The engine also relates to an aerofoil made from the sub-assembly and a method of making such an aerofoil.

Hollow aerofoils are commonly used on fan blades in civilian turbo fan engines. They are also increasingly used on modern military aircraft. The hollow blades are considerably lighter than solid fan blades. Typically, the blade cavity is formed by super plastic forming (SPF) with some form of internal metallic structure to increase strength and stiffness of the blade and to prevent the skin surfaces of the blade "panting" ie oscillating in and out relative to each other.

It is known to introduce a visco-elastic damping material into the hollow cavity to increase damping and reduce vibration.

SUMMARY OF THE INVENTION

In the applicant's co-pending application GB0713699.7 an arrangement of discrete internal ribs is disclosed. The ribs are attached to opposite walls but not joined together to provide better retention of the visco-elastic damping material. Whilst that arrangement successfully retains the visco-elastic material, there are several issues that exist with it. The rheo-static nature of the visco-elastic materials results in a tendency for the material to flow when loaded in tension. Thus, when the fan blade is running, the visco-elastic material flows due to the centrifugal load. Re-entrant features are required to provide the retention of the visco-elastic material against that centrifugal load. However, manufacturing those structures has proven difficult. Also, the existing method of filling the blade with the visco-elastic material comprises drilling a fill hole through the panel surface which introduces a stress concentration in the region of the hole. That, consequently, requires increased skin thickness to avoid failure around that stress concentration and due to the requirement for a relatively constant skin thickness of the panel, the thickness of the entire panel is determined by the critical case around the stress concentration.

It is an object of the invention to provide an improved method of forming an aerofoil.

According to one aspect of the invention there is provided a method for forming an aerofoil comprising the steps of:
providing a first skin panel,
providing a first web-forming membrane adjacent the first panel, selectively bonding part of the web-forming membrane to parts of the first panel,
providing a second skin panel,
providing a second web-forming membrane,
selectively bonding parts of the second web-forming membrane to parts of the second skin panel,
selectively bonding parts of the first web forming membrane to parts of the second structure-forming membrane,
arranging the panels together so that the first skin panel overlays the second skin panel with the first and second web-forming membranes arranged therebetween to define an aerofoil sub-assembly,
heating the aerofoil sub-assembly to a temperature sufficient to effect plastic deformation of the panels and the web-forming membranes,
inflating the aerofoil sub-assembly to draw the first and second skin panels apart and to cause the first and second web-forming membranes to form webs internally of the aerofoil.

It is an object of the invention to provide an improved aerofoil sub-assembly.

According to another aspect of the invention there is provided an aerofoil sub-assembly comprising a first skin panel overlaying a second skin panel and first and second overlaying web-forming membranes arranged between the first and second skin panels, the first web-forming membrane being arranged adjacent the first panel and a second structure-forming membrane being arranged adjacent the second panel.

Where previously a single web-forming membrane has been arranged between the first and second skin panels, the use of two overlaying membranes allows the structural features formed by the respective membranes to be tailored according to the aforementioned requirement of visco-elastic material retention and, optionally, addresses weaknesses in one or other of the panels.

As described below, the first and second web-forming membranes are preferably adhered to respective parts of the first and second panels and to each other with weak points in one or both of the membranes so that when the subassembly is inflated to draw the first and second skin panels apart, parts of the opposite first and second web-forming members pull past each other so as to, at least partially, form the structures.

According to another aspect of the invention there is provided an aerofoil comprising a first skin panel and a second skin panel spaced apart from the first skin panel to define a hollow body with an internal space, a projection extending part way across the space from the inner side of one of the panels, the projection comprising a root part extending from the panel and a branch part extending outwardly from the root part, the root part being formed from one member and the branch part being formed from another member, bonded to said one member.

Further advantageous features of the above aspects are set out in the claims appended hereto.

An aerofoil sub-assembly, an aerofoil and a method of making an aerofoil in accordance with the invention will now be described in detail by way of example and with reference to the accompanying drawings, in which:

DETAILED DESCRIPTION OF THE DRAWINGS

Figure 1:
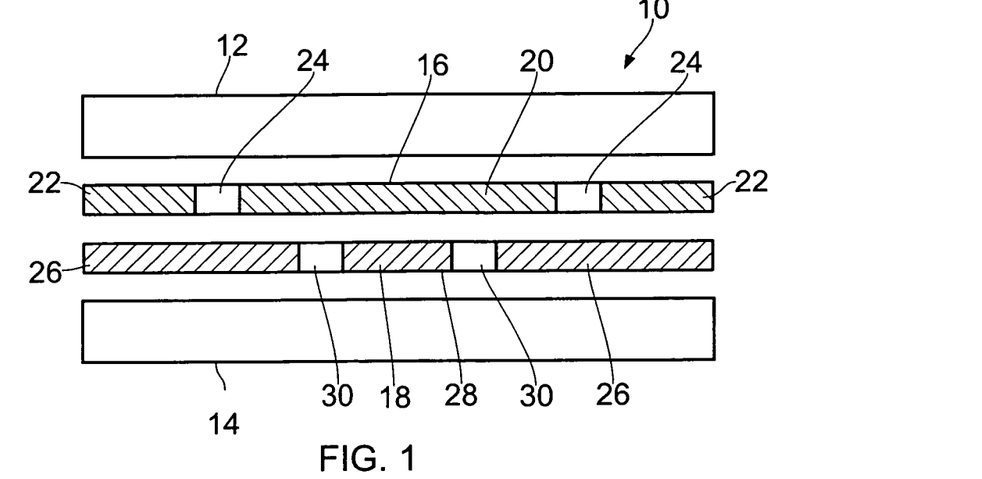
FIGS. 1 to 8 are schematic sectional views through an aerofoil sub-assembly in accordance with the invention illustrating the method according to the invention.

An aerofoil sub-assembly 10 comprises a first skin panel 12 and a second skin panel 14 spaced apart from the first skin panel 12. A first web-forming membrane 16 is arranged between the first and second skin panels adjacent the first skin panel. A second web-forming membrane 18 is arranged between the first and second skin panels adjacent the second skin panel.

The first web-forming membrane 16 is formed from a series of alternating wide and narrow strips 20, 22. The alternating wide and narrow strips 20, 22 are spaced apart by elongate slots 24 which run longitudinally of the membrane 16. The second web-forming membrane 18 also comprises alternating wide and narrow strips 26, 28 respectively, again separated by elongate slots 30.

As shown in FIG. 1, the first web-forming membrane 16 is arranged relative to the second web-forming membrane 18 such that the wide strip 20 of the first web-forming membrane 16 overlays the narrow strip 28 of the second web-forming membrane and vice versa.

Figure 2:
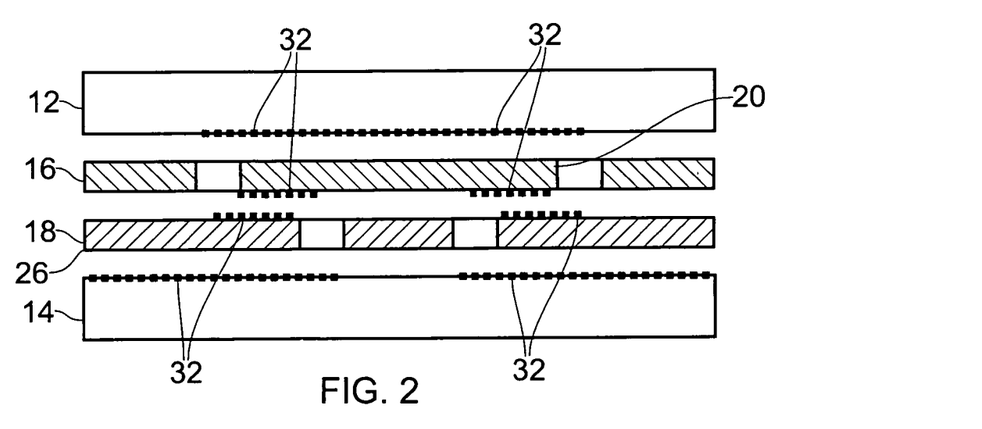
Figure 3:
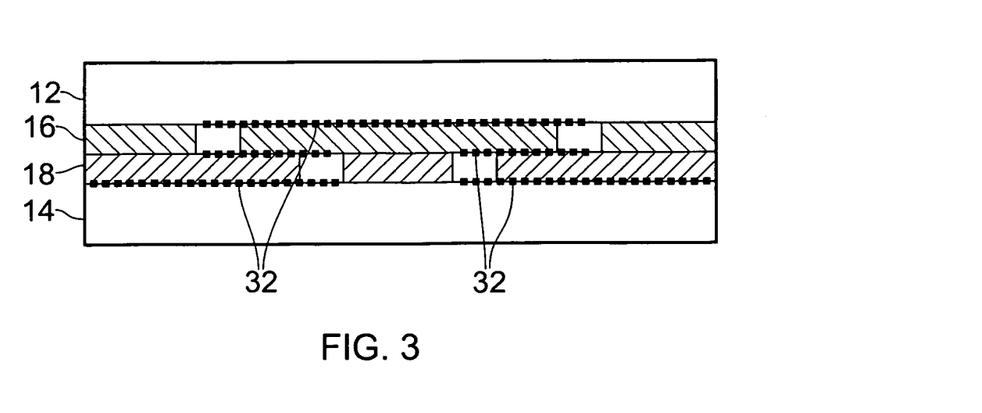

Parts of the inner surfaces of the skin panels and parts of the web-forming membranes are coated with Yttria indicated at 32. The Yttria coating 32 acts as a "release layer" between interfacing parts later in the process.

As shown in FIG. 2 the Yttria coating is applied to the parts of the inner surfaces of the first and second skin panels 12, 14 which, when the sub-assembly 10 is compressed together, will abut the wide strip parts 20, 26 of the respective first and second web-forming membranes 16, 18. The inner faces of the first and second web-forming membranes 16, 18 are treated with Yttria coating 32 at the outer edges of the wide strip parts 20, 26 where those parts will meet when the assembly is compressed. Thus the release coating 32 formed between the first panel 12 and the first web-forming membrane 16 is arranged opposite to a part 20 where the first and second web-forming members 16, 18 are bonded. The release coating 32 applied between the first panel 12 and the first web-forming member 16 is arranged opposite two bonded parts 20, 26 between the second web-forming member 18 and the second skin panel 14.

Figure 4:
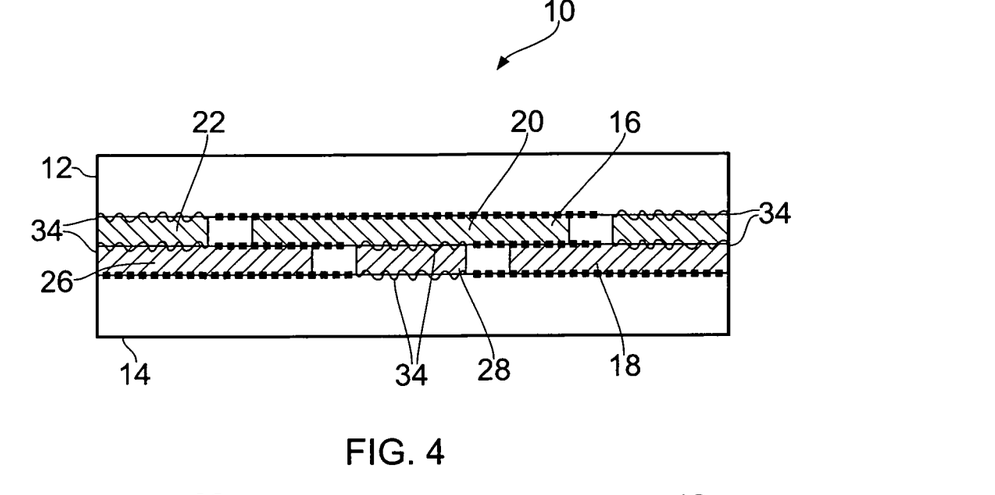

After the relevant surfaces have been coated with Yttria as shown in FIG. 2, the skin panels 12, 14 and membranes 16, 18 are compressed together and heated to the extent that the membranes 16, 18 begin to become attached to the inner surfaces of the panels 12, 14 and to each other except in the areas coated by Yttria 32. The attachment of the membrane 16, 18 to each other and to the panels 12, 14 is effected by diffusion bonding of material. The panels and web-forming membranes are generally all formed from the same material which is suitable for such diffusion bonding and super plastic formation. A typical material for this purpose would be titanium although other materials may be used. After heating and compressing to effect diffusion bonding, the parts of the web-forming membranes and skin panels that were not coated with Yttria are bonded together. Those bonds 34 are represented in FIG. 4 by means of a wavy line at the interface between the panels and membranes and membrane to membrane. Because of the arrangement of the Yttria on the panels 12, 14 and membranes 16, 18 and the arrangement of the membranes 16, 18 relative to the panels 12, 14 and to each other, the bonds 34 are formed across the entire width of the narrow strips 22, 28 on the outer face with the respective panels 12, 14 and on their inner face where they abut the middle part of the wide strips 20, 26.

The aerofoil sub-assembly 10, after the initial heating and diffusion bonding process, comprises the first skin panel 12 with the first web-forming membrane 16 formed from alternating wide and narrow strips 20, 22 with the narrow strips, 22 bonded to the inner face of the first skin panel. The second web-forming membrane 18 overlays the first web-forming membrane 16 and the narrow strips 22 of the first web-forming membrane are bonded to the centre parts of the wide strips 26 of the second web-forming membrane. The narrow strips 28 of the second web-forming membrane 18 are bonded on the outer face to the inner surface of the second skin panel 14.

Figure 8:
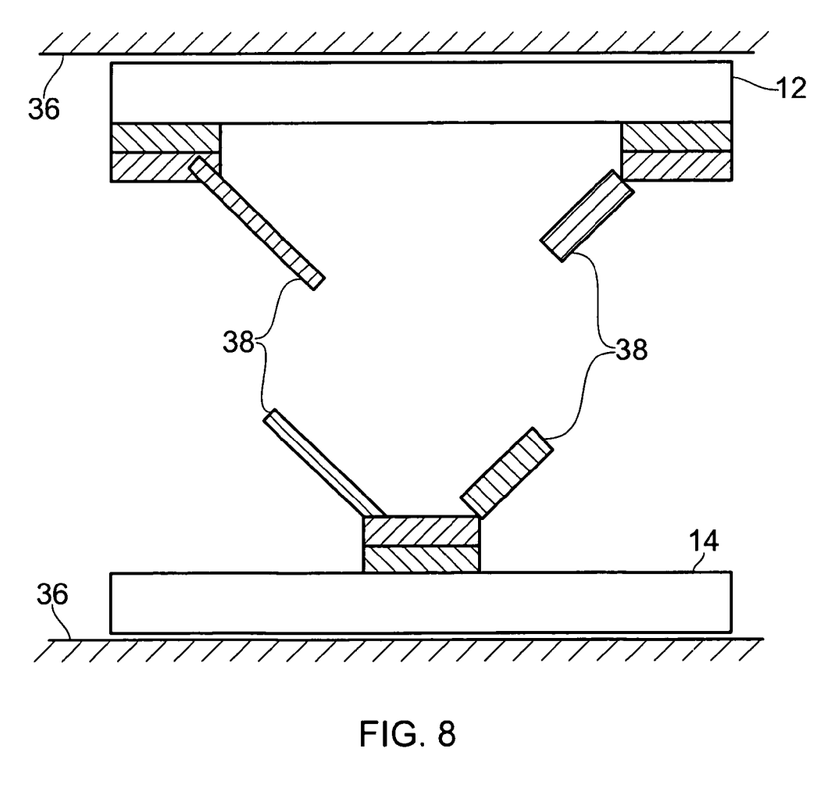

The resulting aerofoil sub-assembly 10 is then arranged in a die 36 (see FIG. 8). The aerofoil sub-assembly is subjected to a conventional super plastic forming operation. In that operation the aerofoil sub-assembly is welded around its edges to ensure gas tightness. The die 36 is evacuated and the aerofoil sub-assembly 10 is heated to a superplastic temperature for the material in question, typically 850° C. for titanium. An inert gas is injected at high pressure into the interior of the aerofoil sub-assembly between the panels 12, 14. At the elevated temperature, the pressure differential between the high pressure gas inside the panels 12, 14 pushes the panels apart. The panels 12, 14 continue to move apart until they contact the die 36. The die 36 has the desired final form of the aerofoil and the high pressure gas ensure that the panels 12, 14 are pushed against the surfaces of the die to provide the aerofoil sub-assembly with the final shape of the aerofoil.

FIGS. 5-8 illustrate the effects of the inflation (or "blow forming") on the web-forming membranes 16, 18.

Figure 5:
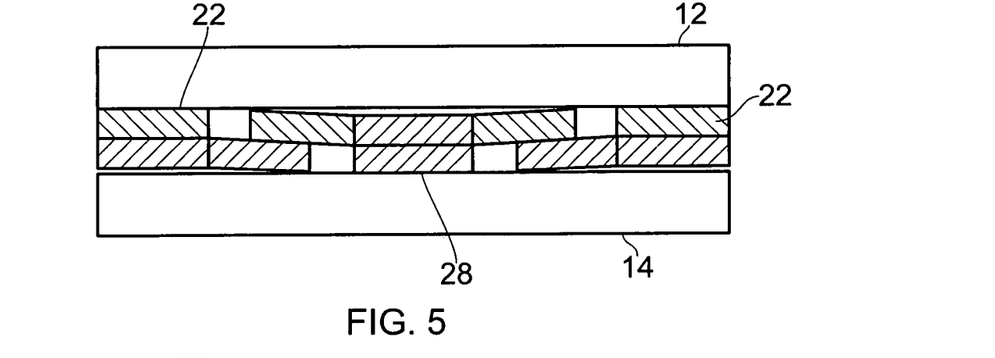
Figure 6:
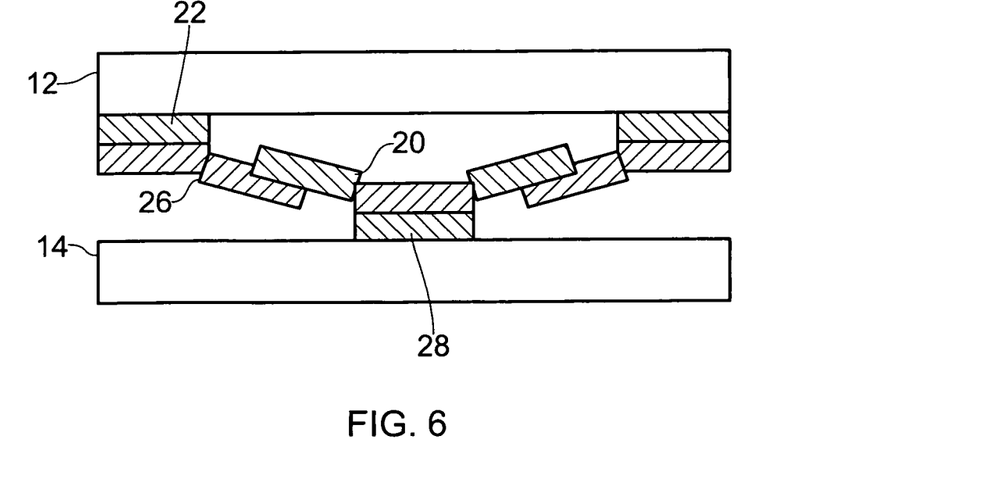
Figure 7:
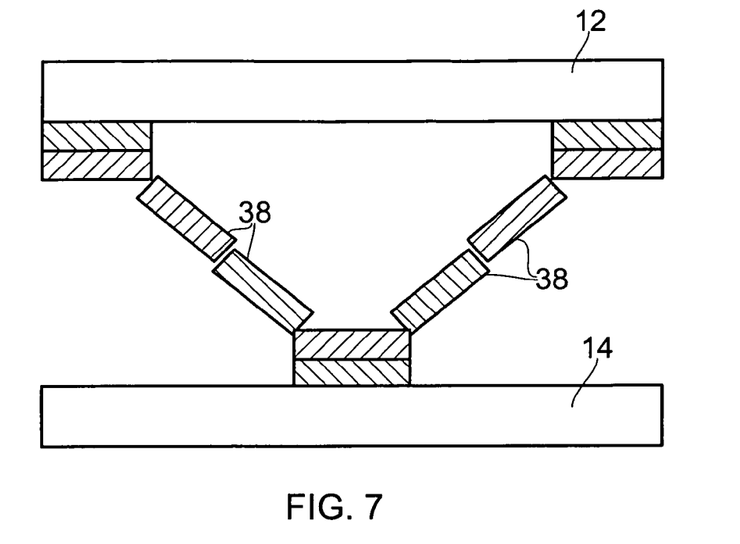

In FIG. 5, the first and second skin panels 12, 14 are shown just as they begin to move apart under the effects of the high pressure gas internally. The narrow strips 22, 28 of the first and second web-forming membranes 16, 18 respectively are bonded to the inner surfaces of the first and second skin panel 12, 14 respectively. They are also bonded to the wide strips 20, 26 on the opposite membrane 16, 18. However, the wide strips 20, 26 are not bonded to the skin panels 12, 14 or to each other. Consequently, as the panels 12, 14 move apart as shown in FIG. 6, the overlapping parts of the wide strips 20, 26 are deformed as a consequence of the moving apart of the panels 12, 14 as shown in FIG. 7, those parts continue to bend upwardly away from the respective panel on which the narrow strip is arranged and the outer parts of the wide strips 20, 26 begin to slide past each other by virtue of the release layer of Yttria 32. Eventually as shown in FIG. 7, those outer parts of the wide strips 20, 26 pull past each other completely and further expansion of the panels 12, 14 apart results in the panels being pushed against the die 36.

By tailoring the thicknesses of the membranes 16, 18, the extent of overlap of the wide strips 20, 26 and the friction between the wide strips 20, 26 by appropriate use of the release coating 32, the eventual shape, size and angular inclination of the outer parts of the wide straps or "ears" 38 can be determined. As shown in FIG. 8, one of the ears 38 is relatively short and thick while the other of the ears 38 is longer and thinner. This can be effected by applying less of a release coating between the left-hand parts of the wide strips 20, 26 in FIG. 8. In that way, as the inflation process pulls the panels 12, 14 apart, rather than sliding past each other, the wide strip 20 and the wide strip 26 will have a weak diffusion bond. That, in turn, will cause the ear parts 38 to be plastically stretched before the diffusion bond gives way. The right hand ears 38 in FIG. 8 have full Yttria coating so that they merely slide past each other as the panels 12, 14 move apart.

Figure 9:
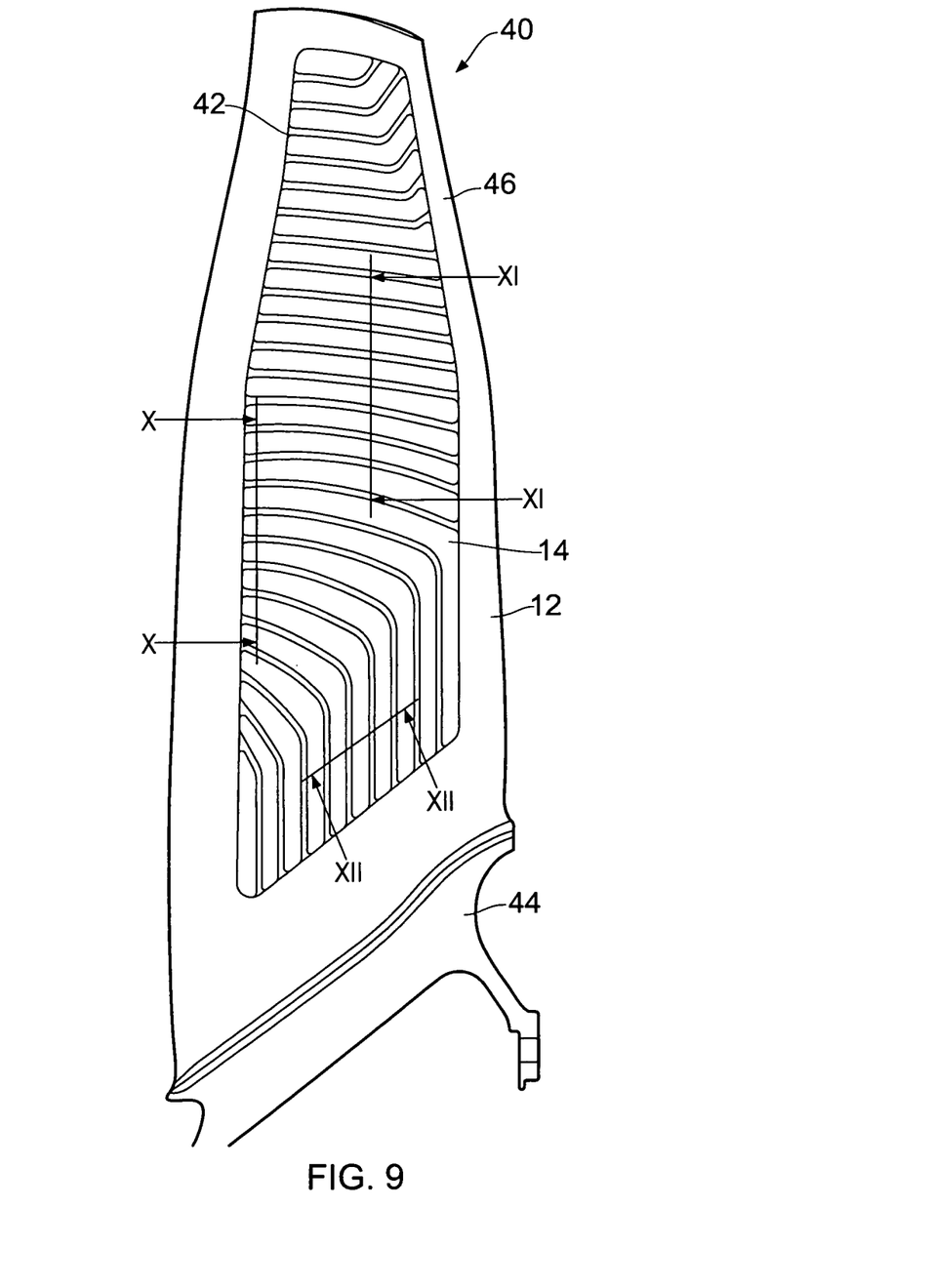
FIG. 9 is a side elevation of an aerofoil in accordance with the invention with part of the outer skin removed to show the pattern of webs internally of the aerofoil.

In FIG. 9, an aerofoil 40 is shown in the form of a fan blade for a civilian turbo fan engine. The aerofoil 40 comprises a first skin panel 12 part of which is cut away to show the pattern of webs within the aerofoil 40. A second skin panel 14 forms the rear skin of the aerofoil 40 as shown in FIG. 9.

A series of webs 42 are formed.

The aerofoil 40 has a blade root 44 and a blade body 46.

The webs 42 formed within the blade body 46 in the upper part of the blade body spaced away from the blade root 44 generally extend perpendicular to the longitudinal direction of the blade body. Webs 42 adjacent the blade root 44 generally extend longitudinally of the blade body and webs between those two extremes tend to extend for part of their length perpendicular to the longitudinal direction of the body and then curve so as to run parallel with the longitudinal direction.

Figure 10:
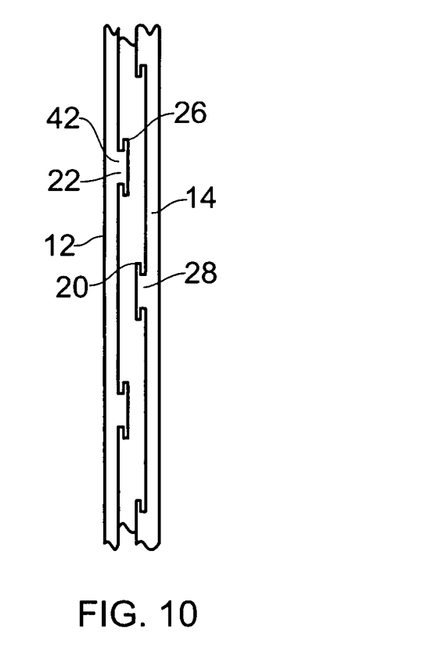
FIGS. 10 to 12 are sectional views through parts of the aerofoil of FIG. 9 taken along lines X-X, XI-XI and XII-XII respectively.
Figure 11:
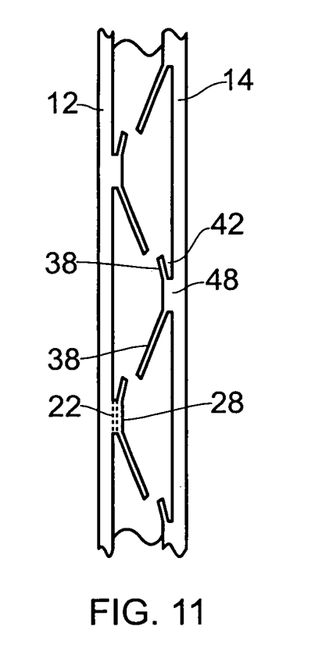
Figure 12:
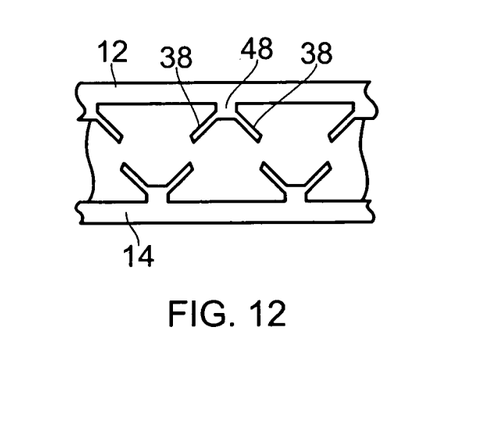

As shown in FIGS. 10-12 it may be preferable to adopt different web sections for different parts of the aerofoil. For example, the webs 42 towards the upper part of the blade body 46 which run substantially perpendicularly to the longitudinal direction of the blade body 46 are preferably "T" shaped in section, as shown in FIG. 10.

In order to make the T-shaped webs, the wide strips 20 of the first web-forming membrane 16 do not overlap at their outer edges with the wide strips 26 of the second web-forming membrane 18. In that way, when the panels 12, 14 are pulled/pushed apart under the inflation (or "blow forming") process the wide strips 20 simply pull away from the panels 12, 14 adjacent which they were originally located.

The webs 42 towards the middle of the blade body 46 are preferably formed with a gamma (Γ) section. The gamma section web comprises a root part 48 formed by the narrow strip 22, 28 and part of the opposite wide strip 20, 26 while extending from the root part 48 in opposite directions are ears 38 of different lengths to each other. Those ears 38 are formed by arranging the wide strips 20, 26 asymmetrically relative to the narrow strips 28, 22 respectively. The wide strips 20, 26 do overlap in the arrangement so as to cause the ears 38 to be inclined relative to the skin panel 12, 14 at a non-zero angle relative thereto.

For the webs 42 towards the blade root 44, a "Y" shaped web section is preferred. The Y-shaped web section is formed as shown in FIGS. 1-8 and is provided with ears 38 of similar length and angular inclination relative to the panels 12, 14.

Figure 13:
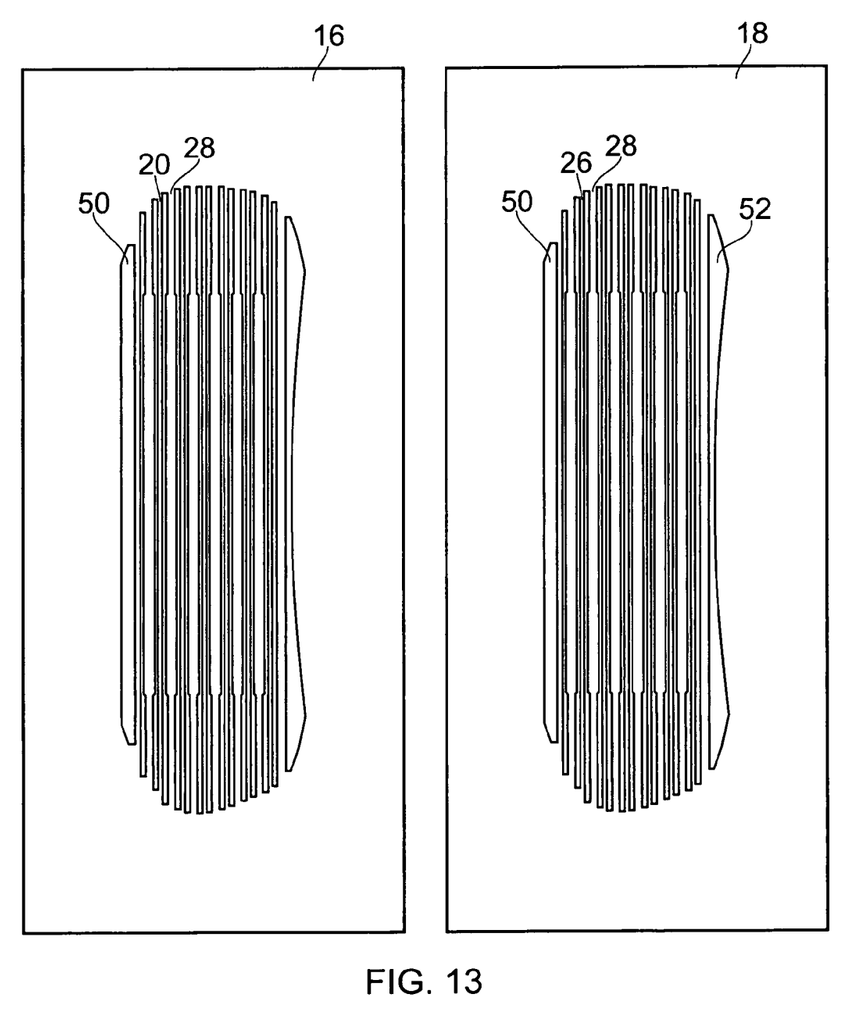
FIG. 13 is a plan view of a pair of web-forming membranes for use in the aerofoil sub-assembly in accordance with the invention.
Figure 15:
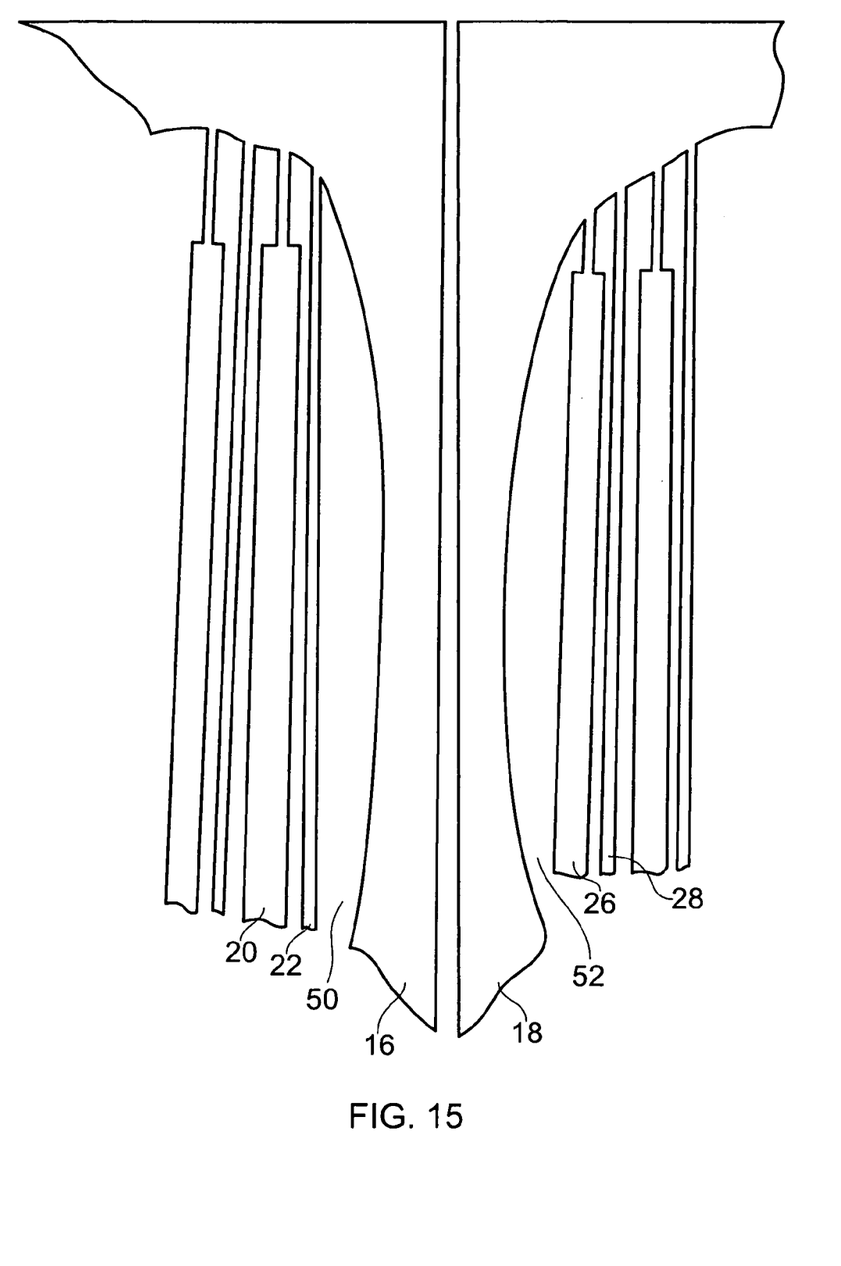
FIG. 15 is an enlarged view of respective parts of the pair of web-forming membranes of FIG. 13.

FIGS. 13 and 15 illustrate in more detail the first and second web-forming membranes. The membranes 16, 18 are provided in pairs. Each membrane has an aperture 50, 52 which corresponds substantially in shape to a section through the internal space to be defined by the first and second skin panels when moulded. The apertures 50, 52 are bridged by the wide and narrow strips 20, 22, 26, 28 respectively.

The first and second web-forming membranes comprise a pair and, as shown in FIG. 15, the strips of the first web-forming membrane alternate wide and narrow while the strips of the second web-forming membrane alternate narrow and wide so that when the first web overlays the second web a wide strip 20 on the first web corresponds to a narrow strip 28 on the second web and vice versa.

Figure 14:
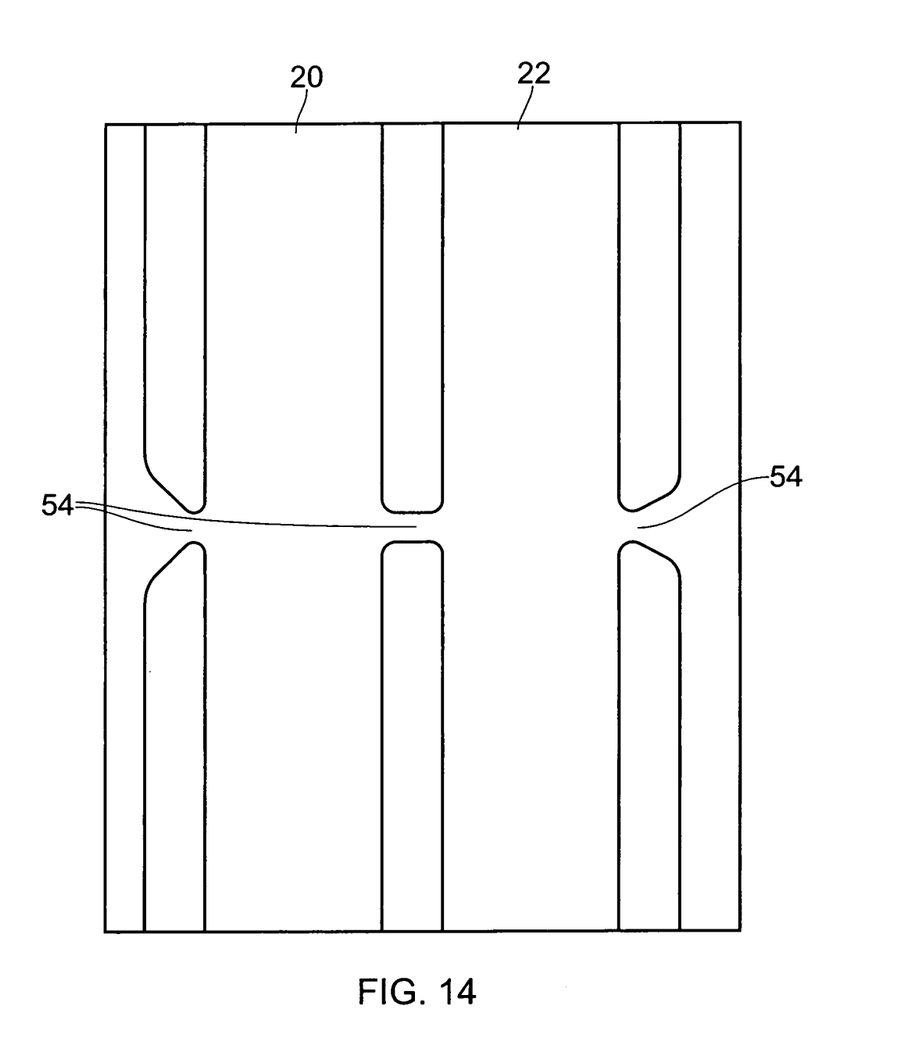
FIG. 14 is an enlarged view of the web-forming membrane of an alternative embodiment to FIG. 13.

In an alternative embodiment of web-forming membrane, shown in FIG. 14, the strips 20, 22, 26, 28 are bridged by frangible bridge members 54 which serve to support the long strips but which break readily when the inflation/blow-forming operation begins.

As mentioned above, fan blades for jet engines formed using the inflation (or "blow forming") technique are hollow and they tend to be filled with a visco-elastic material. The webs 42 formed by the method described above in accordance with the invention provide effective re-entrant features which effectively retain the visco-elastic material within the blades even under the tension created by a centrifugal force of the blade when running. When the blade is filled with visco-elastic material, a fill hole is provided on the panel surface, for example by drilling. That fill hole acts as a stress concentration. Previously, it has been necessary to adopt a skin thickness for the panel which takes into account the critical case around that stress concentration. That results in a thicker skin panel for the entire aerofoil as a relatively uniform skin thickness needs to be adopted to avoid introducing dynamic problems when the blade is under load.

Figure 16:
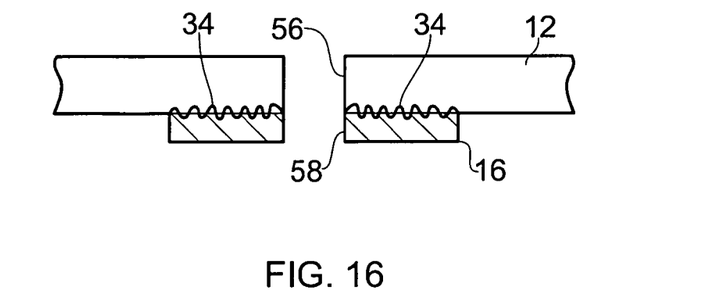
FIG. 16 is a sectional view through an aerofoil sub-assembly in accordance with an embodiment of the invention.

The present invention further envisages arranging part of the web-forming membrane around a fill hole, as shown in FIG. 16, where a fill hole 56 is provided in the first skin panel 12. The first web-forming membrane 16 is bonded to the first skin panel 12 by the aforementioned diffusion bonding method and the membrane can be cut so as to provide an aperture 58 therethrough to allow passage of the visco-elastic material during filling. The provision of the membrane material around the fill hole 56 locally thickens the skin 12 around that stress concentration which allows the remainder of the skin to be thinner than would otherwise be the case. Thus the step of providing an aperture 58 in one of the skin panels 12 and bonding part of the web-forming membrane 16 around the aperture 58 reinforces the panel in the area of the aperture 58.

Whilst the present invention has been described specially with relation to an aerofoil for use in a fan blade of a civilian turbo fan engine, the invention could be applied to any aerofoil assembly.

The invention claimed is:

1. A method for forming an aerofoil comprising:
providing a first skin panel;
providing a first web-forming membrane adjacent the first panel;
selectively bonding part of the web-forming membrane to parts of the first panel;
providing a second skin panel;
providing a second web-forming membrane;
selectively bonding parts of the second web-forming membrane to parts of the second skin panel;
selectively bonding parts of the first web forming membrane to parts of the second web-forming membrane;
arranging the panels together so that the first skin panel overlays the second skin panel with the first and second web-forming membranes arranged therebetween to define an aerofoil sub-assembly;
heating the aerofoil sub-assembly to a temperature sufficient to effect plastic deformation of the panels and the web-forming membranes; and
inflating the aerofoil sub-assembly, after the bonding steps and the heating step, to draw the first and second skin panels apart and to cause the first and second web-forming membranes to form webs internally of the aerofoil.

2. A method for forming an aerofoil according to claim 1 wherein the step of providing a first web-forming membrane comprises the step of providing a first web-forming membrane having weakened portions spaced apart from each other.

3. A method for forming an aerofoil according to claim 2 wherein the weakened portions or slots are spaced so as to define a wide part and a narrow part of the membrane therebetween.

4. A method according to claim 3 wherein the step of arranging the panels together comprises arranging the panels so that the wide part of the first web-forming membrane overlays the narrow part of the second web-forming membrane.

5. A method according to claim 4 wherein the wide part of the first web-forming membrane overlaps with part of the wide part of the second web-forming membrane.

6. A method according to claim 4 wherein the wide part of one of the web-forming membranes overlays the narrow part of the other of the web-forming membranes symmetrically.

7. A method according to claim 4 wherein the wide part of one of the web-forming membranes overlays the narrow part of the other of the web-forming membranes asymmetrically.

8. A method according to claim 4 wherein the step of inflating the aerofoil sub-assembly to draw the first and second skin panels apart and to cause the first and second web-forming membranes to form webs causes the overlapping parts of the wide parts of the web forming membranes to deform inwardly relative to the skin panels and to pull past each other.

* * * * *